(12) United States Patent
Curran (10) Patent No.: US 9,046,281 B2
(45) Date of Patent: Jun. 2, 2015

(54) PORTABLE, SELF-SUSTAINED SOLAR DEPLOYMENT

(75) Inventor: Seamus Curran, Houston, TX (US)

(73) Assignee: UNIVERSITY OF HOUSTON, Houston, TX (US)

(*) Notice: Subject to any disclaimer, the term of this patent is extended or adjusted under 35 U.S.C. 154(b) by 362 days.

(21) Appl. No.: 13/493,195

(22) Filed: Jun. 11, 2012

(65) Prior Publication Data

US 2012/0313569 A1 Dec. 13, 2012

Related U.S. Application Data

(60) Provisional application No. 61/495,554, filed on Jun. 10, 2011.

(51) Int. Cl.
| | |
|---|---|
| H01M 10/44 | (2006.01) |
| H01M 10/46 | (2006.01) |
| F24J 2/52 | (2006.01) |
| H02J 7/35 | (2006.01) |
| H01L 31/042 | (2014.01) |
| H02S 30/20 | (2014.01) |
| F24J 2/54 | (2006.01) |

(52) U.S. Cl.
CPC *F24J 2/523* (2013.01); *Y02E 10/50* (2013.01); *Y02B 10/12* (2013.01); *F24J 2/5264* (2013.01); *H02J 7/355* (2013.01); *F24J 2002/5277* (2013.01); *F24J 2002/5455* (2013.01); *F24J 2002/5486* (2013.01); *Y02E 10/47* (2013.01); *H02S 20/00* (2013.01); *H02S 30/20* (2014.12)

(58) Field of Classification Search
CPC ......... H02J 7/35; Y02E 10/566; Y02E 10/50; B60H 1/00828; F03D 1/001; F03D 9/02; F05B 2240/941; F21V 23/0442

USPC .......................................... 320/101, 138, 139
See application file for complete search history.

(56) References Cited

U.S. PATENT DOCUMENTS

| | | | | |
|---|---|---|---|---|
| 4,131,801 | A | * 12/1978 | Hogan | .............................. 5/601 |
| 4,315,163 | A | 2/1982 | Bienville et al. | |
| 4,481,562 | A | 11/1984 | Hickson et al. | |
| 4,786,851 | A | 11/1988 | Fujii et al. | |
| 5,111,127 | A | 5/1992 | Johnson et al. | |
| 5,131,955 | A | * 7/1992 | Stern et al. | .................... 136/245 |
| 5,522,943 | A | 6/1996 | Spencer et al. | |
| 5,969,501 | A | 10/1999 | Glidden et al. | |
| 6,173,923 | B1 | 1/2001 | Penera | |
| 6,201,181 | B1 | 3/2001 | Azzam et al. | |
| 6,396,239 | B1 | 5/2002 | Benn et al. | |
| 6,453,678 | B1 * | 9/2002 | Sundhar | .......................... 62/3.2 |
| 6,960,717 | B2 * | 11/2005 | Stuart et al. | ................... 136/246 |
| 6,972,689 | B1 * | 12/2005 | Morgan et al. | ............. 340/815.4 |

(Continued)

OTHER PUBLICATIONS

International Search Report and Written Opinion for PCT/US2012/041849 dated Sep. 6, 2012.

*Primary Examiner* — Brian Ngo
(74) *Attorney, Agent, or Firm* — Winstead PC (57) ABSTRACT

A solar panel deployment system includes a main support frame and a solar panel array providing at least one solar panel, wherein the solar panel array is coupled to the main support frame, and each of the solar panels are mounted in a solar panel frame. The system also includes a lift mechanism coupled to the main support frame and solar panel array, and an array extender/retractor coupled to the solar panel array, wherein the array extender/retractor is actuated to deploy the solar panel array or to retract the solar panel array.

24 Claims, 11 Drawing Sheets

(56) References Cited

U.S. PATENT DOCUMENTS

| | | |
|---|---|---|
| 7,230,819 B2 | 6/2007 | Muchow et al. |
| 7,898,212 B2 * | 3/2011 | Benn et al. ............... 320/101 |
| 2003/0070704 A1 * | 4/2003 | Hart et al. ............... 136/246 |
| 2004/0094691 A1 * | 5/2004 | Redler et al. ............ 250/203.3 |
| 2006/0086569 A1 * | 4/2006 | Brown, Sr. ............... 182/63.1 |
| 2006/0137348 A1 | 6/2006 | Pas |
| 2007/0039610 A1 * | 2/2007 | Head et al. ............... 126/605 |
| 2009/0165841 A1 * | 7/2009 | Gunn et al. ............... 136/245 |
| 2009/0199846 A1 | 8/2009 | Collins et al. |
| 2009/0320827 A1 * | 12/2009 | Thompson et al. ........ 126/576 |
| 2010/0071684 A1 | 3/2010 | Cowan et al. |
| 2010/0141201 A1 | 6/2010 | Littrell et al. |
| 2010/0250284 A1 * | 9/2010 | Roche et al. ............... 705/3 |
| 2010/0307479 A1 | 12/2010 | Park |
| 2010/0330898 A1 * | 12/2010 | Daniels ..................... 454/365 |

\* cited by examiner

PORTABLE, SELF-SUSTAINED SOLAR DEPLOYMENT

RELATED APPLICATIONS

This application claims the benefit of U.S. Provisional Patent Application No. 61/495,554 to Seamus Curran, filed on Jun. 10, 2011, which is incorporated herein by reference.

FIELD OF THE INVENTION

This invention relates to devices and methods providing portable, self-contained, and/or movable units for deploying rigid and/or flexible solar panels. More particularly, such devices or methods may provide a deployment system, electronic components, and energy storage system.

BACKGROUND OF INVENTION

The U.S. Department of Energy has mandated that solar power costs are to be reduced by 75% by the year 2020. Many other governments in Europe and Asia support the desire to reduce solar energy costs. Even in areas where land availability is not a major concern, the cost of solar panels or a grid infrastructure may be prohibitive.

Optimizing performance of solar panel arrays may be costly and/or difficult because of the location of the panels. Additionally, many solar panel arrays may be exposed to the elements without protection from harsh weather that may damage the panels or degrade the performance of the panels. Shading is a big problem with almost all solar panel arrays. Whether through the accumulation of dust or detritus picked up from the wind blowing to more hazardous weather patterns including hurricanes, typhoons, tornadoes, gale force winds and even simple heavy wind patterns that cause debris to fly through the air.

Mounted solar array systems are bulky and very expensive. Placing solar panels on a roof of a house has several drawbacks including expense, deployment cost, requiring repairs to be performed while on the roof, potential damage to panels, etc. Such roof systems are problematic for optimizing output because the shape of some roofs may make optimization difficult. Further, the addition of energy storage into roof mounted systems further complicates and increase the cost of such systems.

Additional efforts have been made to design devices that use solar panels for the generation of power from solar panels. For example, U.S. Pat. No. 7,230,819 describes a small deployment system made of a 'hard drive'-like compartment that is used to store energy produced by one or two panels using mechanical fans. U.S. Patent Application Publication No. 2006/0137348 describes an energy station which includes solar panels fixed onto a huge container truck that also has wind turbines and battery storage, hydrogen storage, etc. U.S. Pat. No. 6,396,239 describes a portable solar array that consists of a box with a solar panel connected to it in a similar manner as that suggested by Muchow et al. in U.S. Pat. No. 7,230,819. Johnson et al; (U.S. Pat. No. 5,111,127), Benn et al., (U.S. Pat. No. 6,396,239), Fuji et al. (U.S. Pat. No. 4,786,851), Azzam's box with wheels and a panel (U.S. Pat. No. 6,201,181), and Glidden's trailer rather than a box (U.S. Pat. No. 5,969,501) discuss various arrangements. Hickson (U.S. Pat. No. 4,481,562) and Bienville (U.S. Pat. No. 4,315,163) discuss solar powered energy stations which are not portable and which have a fixed angle support structure. Simple solar panels that may deliver a few hundred watts, but are not attached to any form of scaffolding such as Spencer et al (U.S. Pat. No. 5,522,943).

The systems and methods discussed herein relate to deliver energy in a practical and easy way from renewable energy source. The systems and methods provide a self-contained, portable system that does not need to be connected to a grid. The system is fully retractable and easily adjusted or angled to optimize energy conversion. The system may provide a deployment system, solar panels, lift mechanism, and energy storage system.

SUMMARY OF THE INVENTION

In one implementation, a solar panel deployment system includes a main support frame and a solar panel array providing at least one solar panel, wherein the solar panel array is coupled to the main support frame, and each of the solar panels are mounted in a solar panel frame. The system also includes a tilt-lift mechanism coupled to the main support frame and solar panel array, and an array extender/retractor coupled to the solar panel array, wherein the array extender/retractor is actuated to deploy the solar panel array or to retract the solar panel array.

In another embodiment, a solar panel deployment system includes a main support frame and a solar panel array, wherein the solar panel array is coupled to the main support frame. The system also includes a lift mechanism coupled to the main support frame and solar panel array, wherein the lift mechanism raises or lowers the solar panel array and an array extender/retractor for deploying and retracting the solar panel array. In some embodiments, the array extender/retractor provides scissor arms coupled to the solar panel array, ferrule(s) coupled to said scissor arms, wherein movement of said ferrule(s) extends or retracts said scissor arms; and array rod(s) coupled to said ferrule, wherein said array rod guides the movement of said ferrule.

Some embodiments may provide a battery bank for storing energy generated by the solar panel array. Further, the system may provide sensors, controller(s), monitoring and controlling, and/or a display utilized for gathering data, optimization, monitoring/control, or the like.

The foregoing has outlined rather broadly various features of the present disclosure in order that the detailed description that follows may be better understood. Additional features and advantages of the disclosure will be described hereinafter.

BRIEF DESCRIPTION OF THE DRAWINGS

For a more complete understanding of the present disclosure, and the advantages thereof, reference is now made to the following descriptions to be taken in conjunction with the accompanying drawings describing specific embodiments of the disclosure, wherein.

DETAILED DESCRIPTION

Refer now to the drawings wherein depicted elements are not necessarily shown to scale and wherein like or similar elements are designated by the same reference numeral through the several views.

Referring to the drawings in general, it will be understood that the illustrations are for the purpose of describing particular implementations of the disclosure and are not intended to be limiting thereto. While most of the terms used herein will be recognizable to those of ordinary skill in the art, it should be understood that when not explicitly defined, terms should be interpreted as adopting a meaning presently accepted by those of ordinary skill in the art.

It is to be understood that both the foregoing general description and the following detailed description are exemplary and explanatory only, and are not restrictive of the invention, as claimed. In this application, the use of the singular includes the plural, the word "a" or "an" means "at least one", and the use of "or" means "and/or", unless specifically stated otherwise. Furthermore, the use of the term "including", as well as other forms, such as "includes" and "included", is not limiting. Also, terms such as "element" or "component" encompass both elements or components comprising one unit and elements or components that comprise more than one unit unless specifically stated otherwise.

This application is related to U.S. Provisional Patent Application No. 61/296,524, filed on Jan. 20, 2010 and U.S. patent application Ser. No. 13/010,406, filed on Jan. 20, 2011. The entirety of the above related applications are incorporated by reference.

Devices and methods for the fabrication of a standalone, self-contained, movable unit for the deployment of solar panels is discussed herein. Such devices may be comprised of several components, including a deployment/retraction mechanism, electronic components, lift mechanism and an energy storage unit. The devices are able to support the generation of 1 kW or more of power from renewable energy source.

Figure 1A:
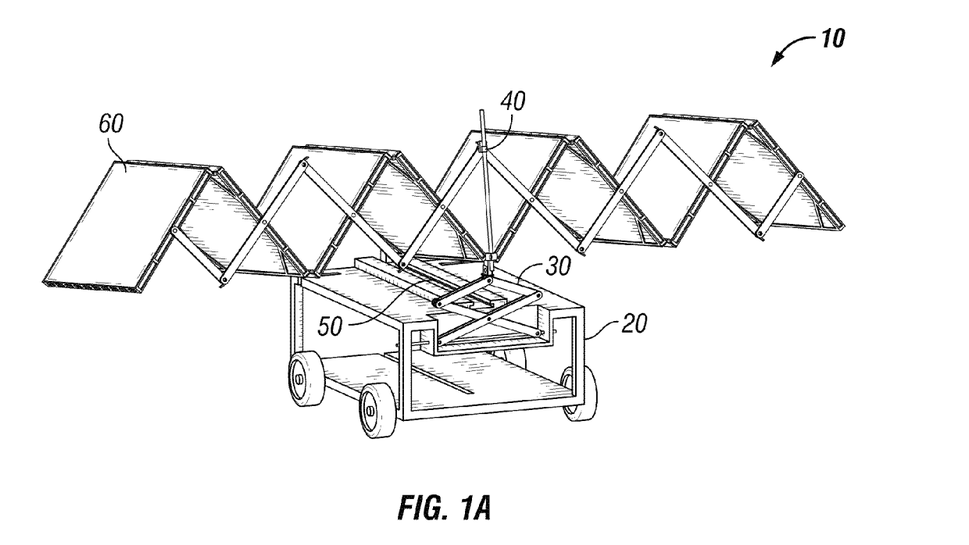
FIG. 1A is an illustrative implementation of a portable unfolding solar panel array system.

FIG. 1A is an illustrative implementation of a portable unfolding solar panel array system 10. Solar panel array system 10 may provide a main support frame 20, lift mechanism 30, array extender/retractor 40, rail 50, and array 60. Main support frame 20 provides a supporting frame for several of the components of solar panel array system 10. Lift mechanism 30 and rail 50 may be utilized to provides a mechanism that lifts and/or tilts array 60 up from main support frame 20 or retracts array 60 towards main support frame 20. Array extender/retractor 40 may extend array 60 into a deployed position or retract the array into a retracted position. Array 60 provides one or more solar panels. In some embodiments, one or more of these components may be omitted if desired. Exemplary embodiments of each of these components are discussed in detail below.

Figure 1B:
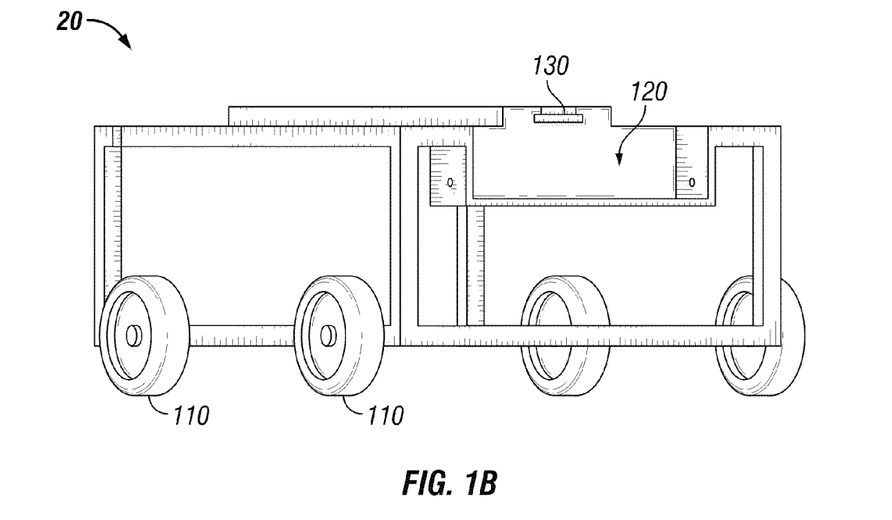
FIG. 1B is an illustrative implementation of a main support frame.

FIG. 1B is an illustrative implementation of a main support frame 20. Main support frame 20 may provide structural support to various components of a solar panel array system and may allow the system to portable or easily transported. While main support frame 20 is shown without sides for the purposes of clarity and illustration, an interior portion may surrounded on all sides to provide an interior region that is protected from the elements. Main support frame 20 may provide wheels 110 to allow the solar panel array system to be easily moved, positioned, transported, or the like. While the embodiment shown provides four wheels, in other embodiments, two or more wheels may be utilized. Main support frame 20 may provide a lift section 120 for mounting a lift mechanism. Main support frame 20 may provide a rail 130 that is utilized in a tilt mechanism. The lift section 120 or rail 130 may be positioned at any suitable location on main support frame 20. In another embodiment, the main support frame may allow an array of solar panels to be retracted into the main support frame in other embodiments.

Figure 1C:
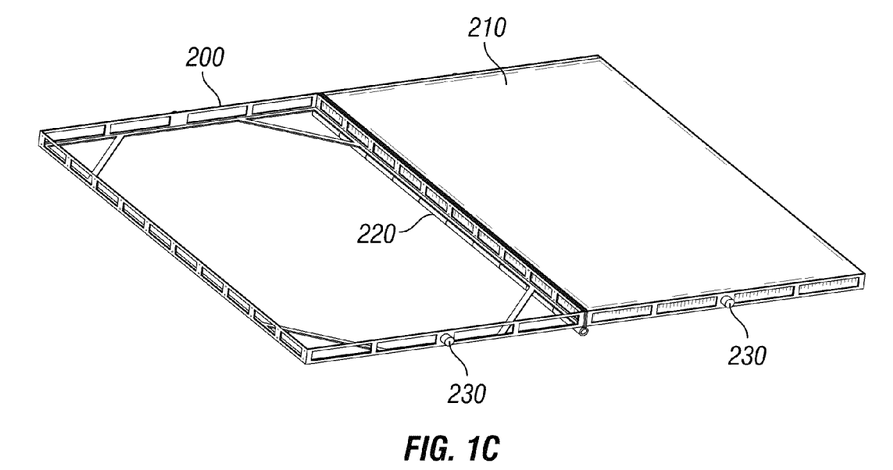
FIG. 1C is an illustrative implementation of a solar panel frame.
Figure 1D:
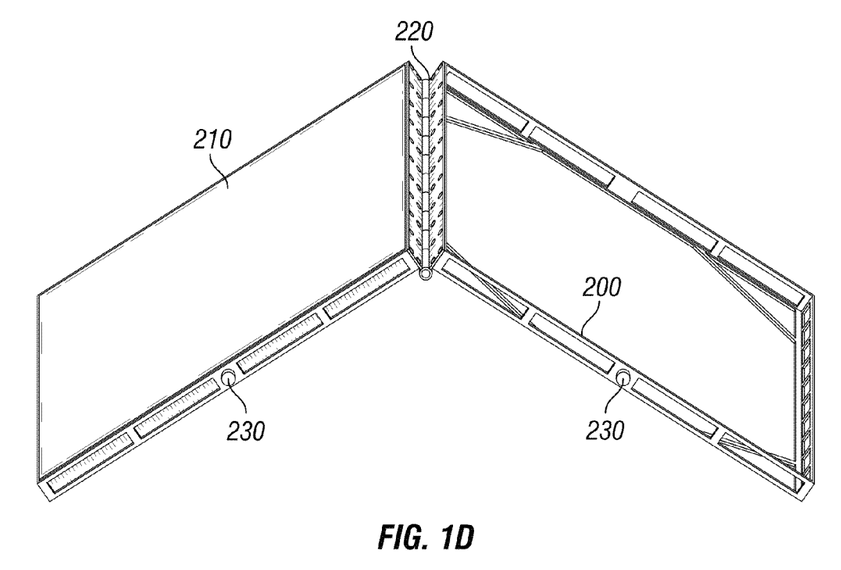
FIG. 1D is an illustrative implementation of hinged solar panels and a solar panel frame.

FIG. 1C is an illustrative implementation of a solar panel frame 200. Solar panel frame 200 is utilized to secure a solar panel 210. Solar panel frame 200 may be coupled to one or more additional frames with a hinge 220 to form an array of solar panels. Each solar panel frame may provide a pivot point 230. While pivot point 230 is positioned near the center, in other embodiments, the pivot point may be positioned at any suitable location on the solar panel frame. Pivot point 230 may be coupled to an array extender/retractor that allows the solar panels to be deployed or retracted. FIG. 1D is another illustrative embodiment of a solar panel frame 200. As shown, hinge 220 may be secured to a different side of solar panel frame 200.

Figure 1E:
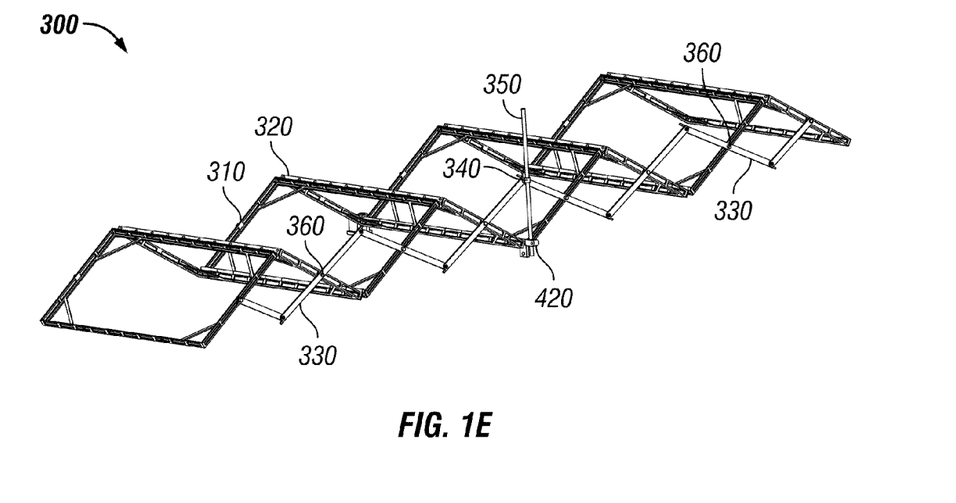
FIG. 1E is an illustrative implementation of a solar panel array.

FIG. 1E is an illustrative implementation of a solar panel array 300. One or more solar panel frames 310 may be coupled together by hinge(s) 320. In some embodiments, an array extender/retractor mechanism may include solar panel frames 310, hinge(s) 320, array extender arms 330, ferrule 340, and rod 350. Each array extender arm 330 may be pivotally attached to one or more additional array extender arm to form a scissor arm that may be folded together or extended apart. For example, a first end of array extender arm 330 may be attached to a first array extender arm, and a second end of array extender arm 330 may be attached to a second array extender arm. Additionally, array extender arm 330 may be pivotally attached to a solar panel frame 310 using a pivot point 360. The side of solar panel frames 310 with pivot point 360 forms another set of scissor arms, which together with array extender arms 330 allow the solar panel array to be deployed or retracted. Ferrule 340 is secured to one or more array extender arm(s) 330 and can move up or down along rod 350 depending on the direction the rod is rotated. For example, in some embodiments, ferrule 340 and rod 350 may be threaded. When ferrule 340 is place on rod 350, the threads mate to allow rotational motion to be translated into linear motion. For example, rotation of rod 350 in a first direction may cause ferrule 340 to move up the rod, and rotation in the opposite direction may cause ferrule 340 to move down the rod or vice versa. As ferrule 340 moves up rod 350 and away from rod guide 420, array extender arms pivot closer together and cause solar panel frames 310 to hinge toward each other. In a fully retracted position, solar panel frames 310 are folded together to form a compact arrangement. Further, the panels may be vertical or nearly vertical. When ferrule 340 is moved down rod 350 toward rod guide 420, array extender arms extend and cause solar panel frames 310 to unfold. In a fully deployed position, solar panel frames 310 are fully unfold. Rotation of rod 350 for retraction/deployment may be motorized and/or manually performed. For example, a motor, hand crank, or the like may be provided to rotate rod 350. In some embodiments, a gear set may be coupled to rod 350 to allow the solar panel array to be easily deployed or retracted. In other embodiments, the array extender/retractor mechanism may be hydraulically operated.

Figure 1F:
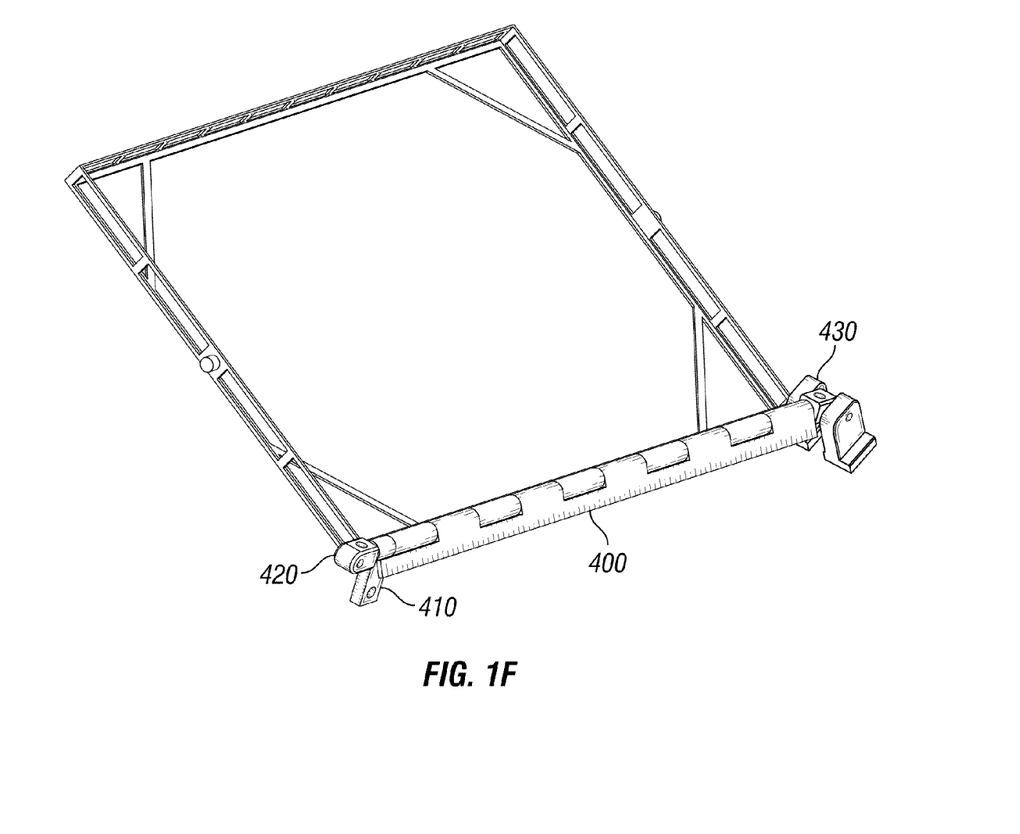
FIG. 1F is an illustrative implementation of a central hinge of a solar panel frame.

FIG. 1F is an illustrative implementation of a central hinge 400 of a solar panel frame 410. The central hinge 400 of a solar panel array may also provide a bracket 410, rod guide 420, and tilt guide 430. Bracket 410 may be utilized to attach the solar panel array to a lift mechanism. Rod guide 420 may be coupled to the rod that is utilized to retract and deploy the solar panel array. In some embodiments, rod guide 420 may be threaded and the rod coupled to rod guide 420 may be dual threaded. A dual threaded rod provides a portion of the rod that is threaded in a first direction and another portion of the rod that is threaded in the opposite direct. As a result of dual threading, when the rod rotates, a threaded ferrule positioned on a first threaded portion of the rod moves in a first direction while a threaded rod guide 420 positioned on a second threaded portion of the rod moves in a opposite direction. This allows deployment and retraction to occur more quickly than single threading since the ferrule and rod guide both move in opposite directions relative to the rotating rod. In other embodiments, rod guide 420 may allow the rod rotate while it is secured in a constant vertical position relative to the rod. When the rod is rotated, the ferrule moves up or down the rod to retract or deploy the solar panel array while the position of rod guide 420 remains in a constant vertical position. Tilt guide 430 may fit into a rail provided by the main support frame.

The portable unfolding solar panel array system allows for deployment in a short timeframe by a single operator with little physical effort. The system is able to support the generation of 1 kW or greater of solar energy from the panels. The solar panels in the array may be silicon based, CdTe, or any suitable type of solar panels. For example, the solar panels may be 250 W Sharp solar panels or any other suitable panels from other manufacturers.

Figure 1G:
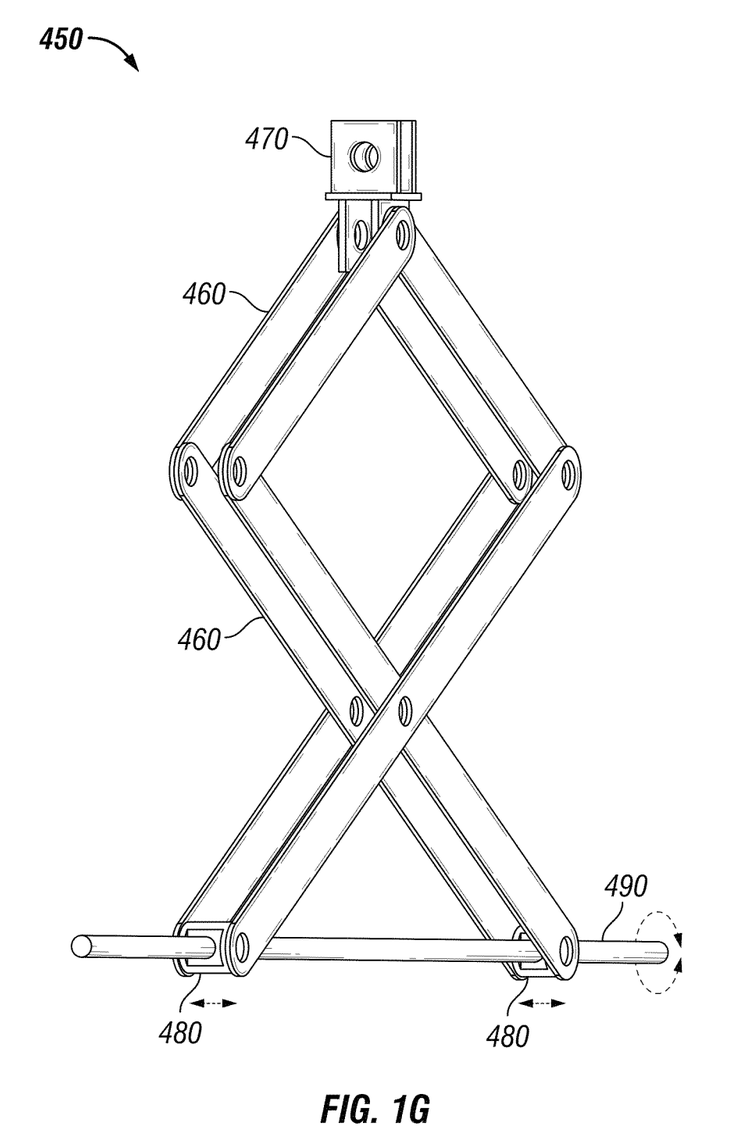
FIG. 1G is an illustrative implementation of a lift mechanism.

FIG. 1G is an illustrative implementation of a lift mechanism 450. Lift mechanism 450 allows the solar panel array to be raised or lowered. Lift mechanism 450 allows for the orientation of the solar panel array to ensure optimum energy conversion efficiency. Using the lift mechanism the solar panel array can be set to an optimum angle for harvesting the maximum sunlight density at any location, time, day, etc. Lift mechanism may provide scissor arms 460, array connector 470, ferrules 480, and rod 490. Array connector 470 may be utilized to couple the lift mechanism 450 to a solar panel array. A first end of the scissor arms 460 is coupled to array connector 470, and a second end of the scissor arms 460 opposite the first end provides ferrules 480. Ferrules 480 may be coupled to rod 490, which may rotate within ferrules 480. In some embodiments, one or more ferrules 480 are threaded, and rod 490 provides a threaded portion. When rod 490 rotates, threaded ferrule(s) 480 move along rod 490. In other embodiments, both ferrules 480 are threaded and rod 490 is dual threaded to allow ferrules 480 to move in opposite directions along rod 490 when the rod is rotated. Rotation of rod 490 moves array connector 470 and ferrules 480 closer together or further apart depending on whether the rod is rotated in a first direction or opposite direction.

Figure 2:
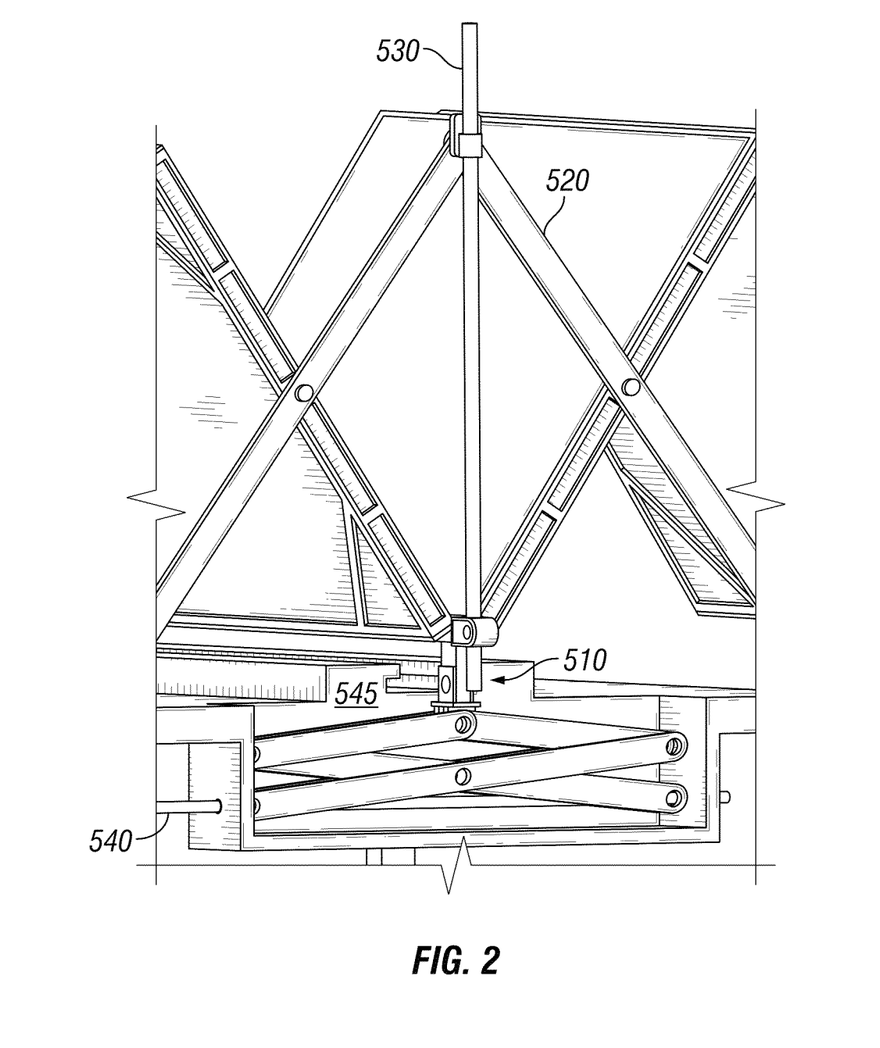
FIG. 2 is an illustrative implementation of a solar panel array lift mechanism and array extender/retractor.
Figure 3:
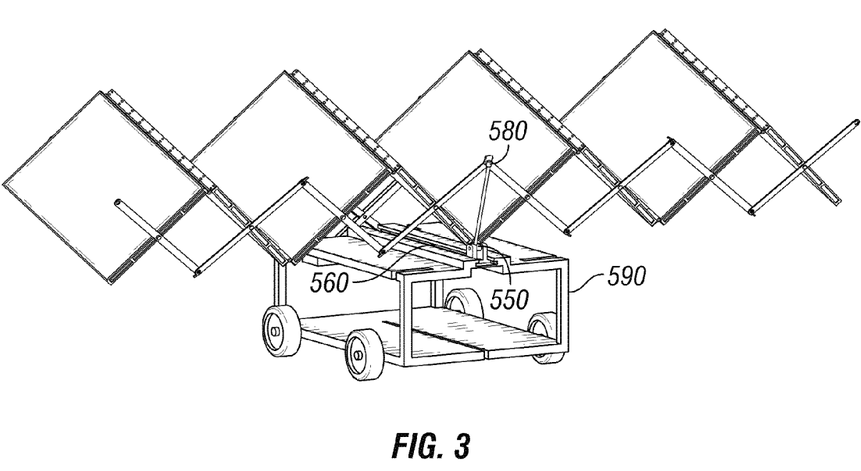
FIG. 3 is an illustrative implementation of a front view of an embodiment of a portable unfolding solar panel array system.
Figure 4:
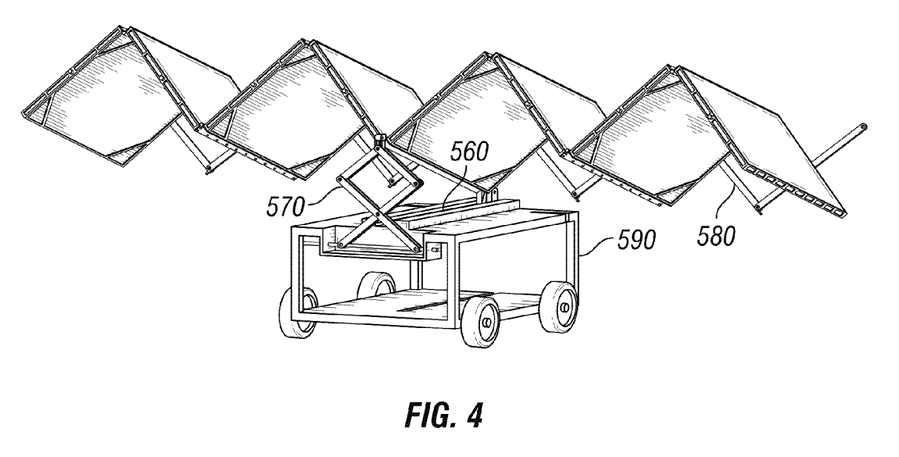
FIG. 4 is an illustrative implementation of a rear view of an embodiment of a portable unfolding solar panel array system.

FIG. 2 is an illustrative implementation of a solar panel array lift mechanism 510 and array extender/retractor 520. Array rod 530 is rotated to deploy/retract the solar panel array, and lift rod 540 is rotated to lift/lower the solar panel array. In the embodiment shown, the lift mechanism 510 and array extender/retractor 520 are provide on the same side of the system. Guide rail 545 secures the tilt guide of the solar panel array. In some embodiments, the tilt guide remains in a locked position within guide rail 545. In other embodiments, the tilt guide is slidably coupled to guide rail 545 and may slide within guide rail 545. FIGS. 3 and 4 is an illustrative implementation of embodiments of a portable unfolding solar panel array system. The portable unfolding solar panel array system may utilize a similar deployment method as previously described. However, the lift mechanism 570 and array extender/retractor 580 are provided on opposite sides of the system. The lift mechanism 570 may be concealed within the main support frame 590. Lift Tilt guide 550 is coupled to rail 560.

Figure 5A:
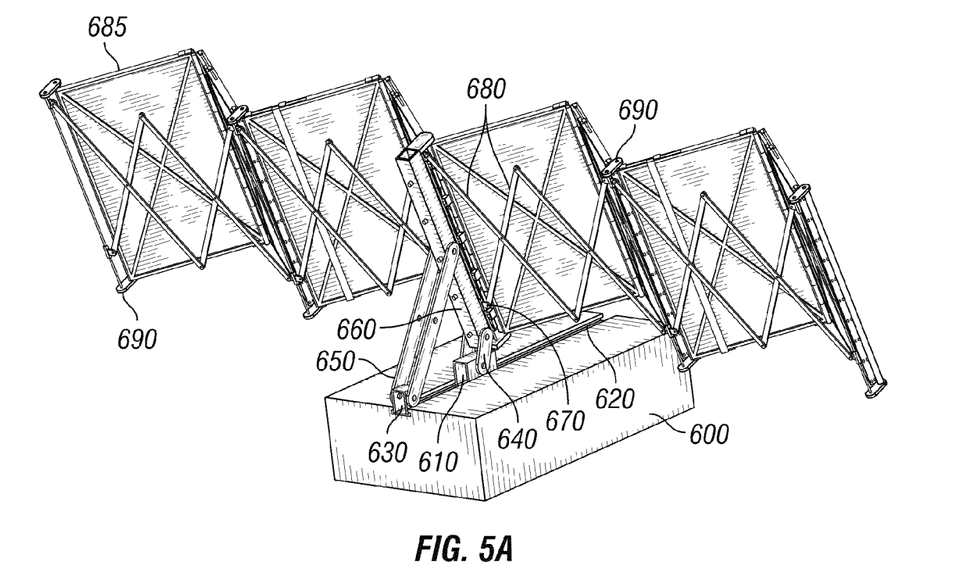
FIG. 5A is an illustrative implementation of another embodiment of a portable unfolding solar panel array system.
Figure 5B:
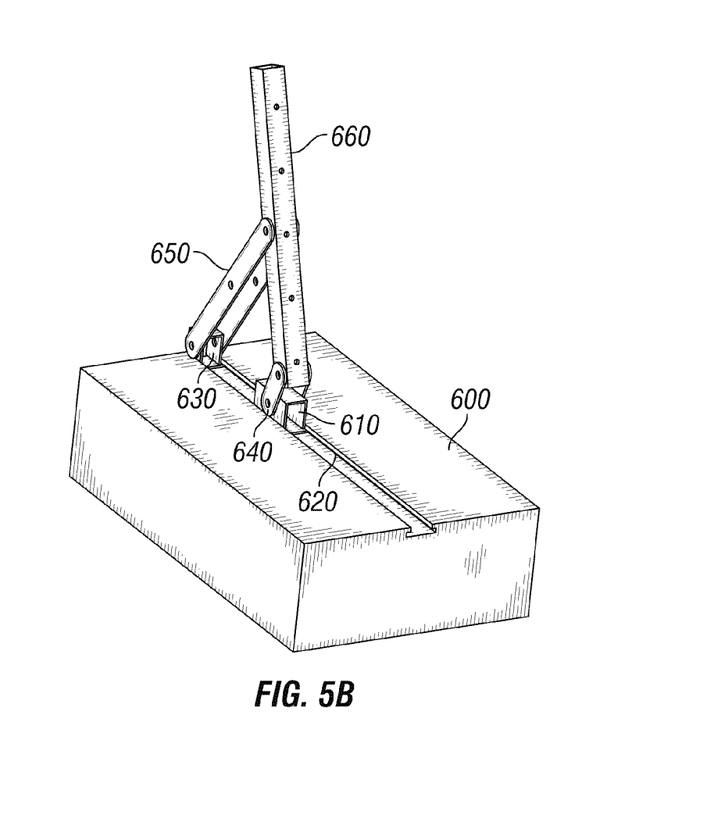
FIG. 5B is an illustrative implementation of a lift mechanism.

FIG. 5A is an illustrative implementation of another embodiment a portable unfolding solar panel array system. Main support frame 600 supports the system, and may optionally provide wheels for ease of transport. In some embodiments, the lift mechanism may be a mast deployment mechanism. FIG. 5B is an illustrative implementation of a more detailed view of a lift mechanism or mast deployment mechanism. A lower guide 610 and rear mast mount 630 may be secured within rail 620. The lower guide 610 is pivotally attached to knuckle 640, and rear mast mount 630 is pivotally attached to rear mast support 650. Knuckle 640 and rear mast support 650 are both pivotally coupled to main mast 660. The mast deployment mechanism provides support for the solar cells array, and allow the array to be tilted to an optimum angle to ensure maximum solar harvesting. Main mast 660 pivots from the lower guide 610, which is actuated along the rail 620. For example, a rack and pinion system may be provide by rail 620 to move lower guide 610 forward/backward along rail 620. In other embodiments, the rack and pinion may be substituted with any suitable actuation method. For example, a threaded rod and threaded ferrule arrangement, hydraulic actuator, or the like may be utilized. In some embodiments, rear mast mount 630 is fixed and acts as a pivot for the rear mast support 650, which is also attached to the main mast 660. When lower guide 610 is moved away from rear mast mount 630, the solar panel array approaches a horizontal position. As lower guide 610 is moved towards rear mast mount 630, the solar panel array become more tilted towards a vertical position. The robust nature of the main mast 660 also provides a structurally stable platform on which the solar array and extension mechanism can be mounted.

In the embodiment shown, the rear mast support 650 is longer than knuckle 640. In another embodiment, knuckle 640 may be equal in length or longer than rear mast support 650. Further, in some embodiments, both the lower guide 620 and rear mast mount 630 may be moved along rail 620. As such, the solar panel array can be tilted in both directions by moving lower guide 610 and rear mast mount 630.

Figure 5C:
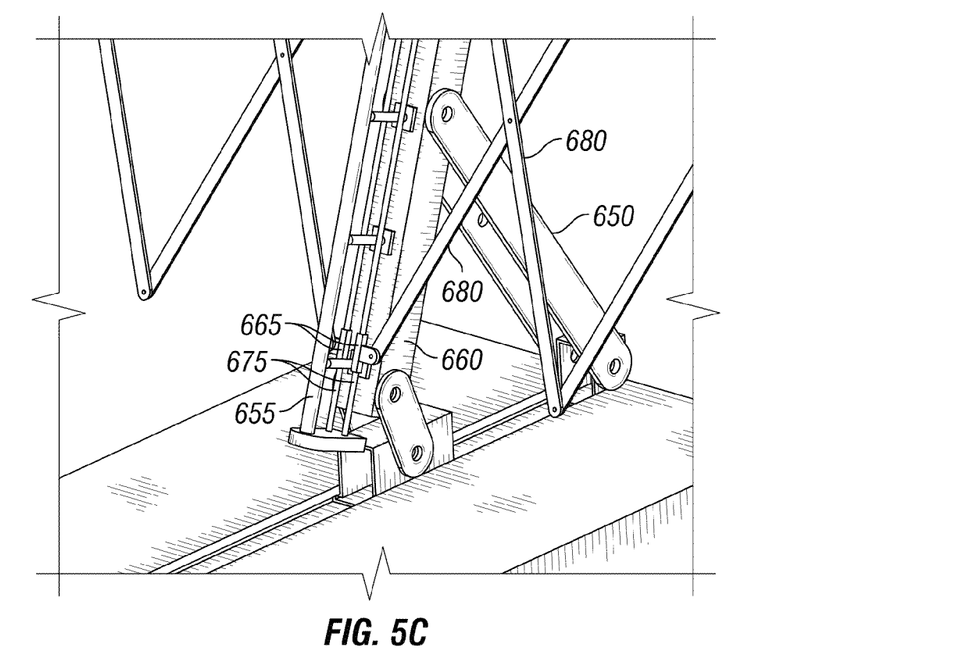
FIG. 5C is an illustrative implementation of a close up view of an array extender/retractor mechanism partially extended.
Figure 5D:
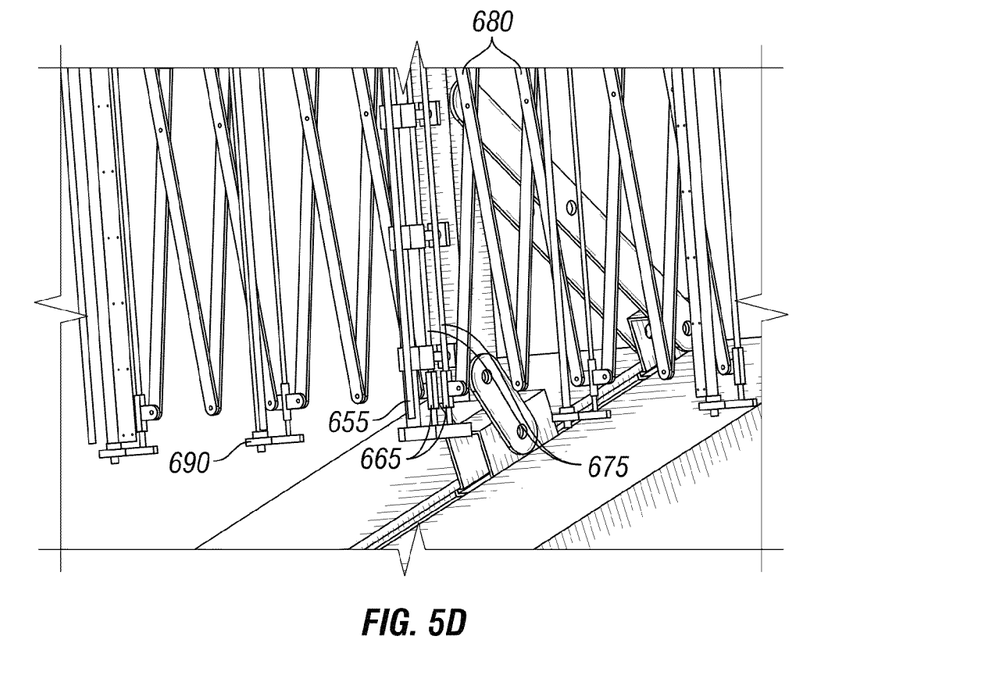
FIG. 5D an illustrative implementation of a close up view of an array extender/retractor mechanism in a retracted position.

The system may also provide an array extender/retractor 670 that is coupled to main mast 660 that allows the solar panel array to be extended or retracted. FIGS. 5C-5D are illustrative implementations of close up views of an extender driver mechanism partially extended and retracted. Array extender/retractor 670 is provide near central hinge 655. Extender arms 680 are coupled together to form scissor arms, which are coupled to panel frames 685 via attachments 690. Note that the panel frames 685 shown in FIG. 5A are not shown in FIGS. 5C-5D for the purposes of clarity and illustration. Attachments 690 are coupled to one or more of the edges of panel frames 685. Attachments 690 provide clearance between the solar panel array and extender arms 680 to allow solar panel array to unfold and extender arms to extend/retract without interference from each other. Extender arms 680 are also coupled to rods 675 via ferrules 665. Each rod 675 is coupled to a top and bottom ferrule 665. Similar to previously discussed scissor arm arrangements, rods 675 and ferrules 665 may be threaded. When rods 675 are rotated, ferrules 665 may move up/down rods 675. In some embodiments, rods 675 may be dual threaded to allow both top and bottom ferrules 665 to move along rods 675 in opposite directions. For example, when rod 675 is rotated in a first direction, top and bottom ferrules on the rod may move toward each other, whereas rotation in the opposite direction causes the top and bottom ferrules to move apart. Because two independent rods 675 that can be rotated independently are provided, each side of the solar panel array can be extended independently. In another embodiment, a single rod 675 that is coupled to all the ferrules 665 may be provided to allow both sides of the solar panel array to be operated simultaneously. FIG. 5C shows a partially extended position in which a top and bottom ferrules 665 are closer together than in a retracted position shown in FIG. 5D in which the top and bottom ferrules 665 are further apart.

The various embodiments of portable unfolding solar panel array systems discussed herein may be mounted on roofs, deployed on the ground, or any other adequate structure. For example, house roofs, building roofs, telecommunications masts/towers, electricity pylons, or any other suitable structure may be suitable support the system. In some embodiments, drawer slides may be provide for deployment of the solar panel array. When weather conditions are poor, whether on ground or on roof, the system can be easily be retracted and a protective case can be placed over it to prevent damage. The solar panels utilized by the system may be treated with a hydrophobic/oleophobic coating to keep the panels cleaner for a longer period of time and therefore reducing the frequency of required cleaning.

Figure 6:
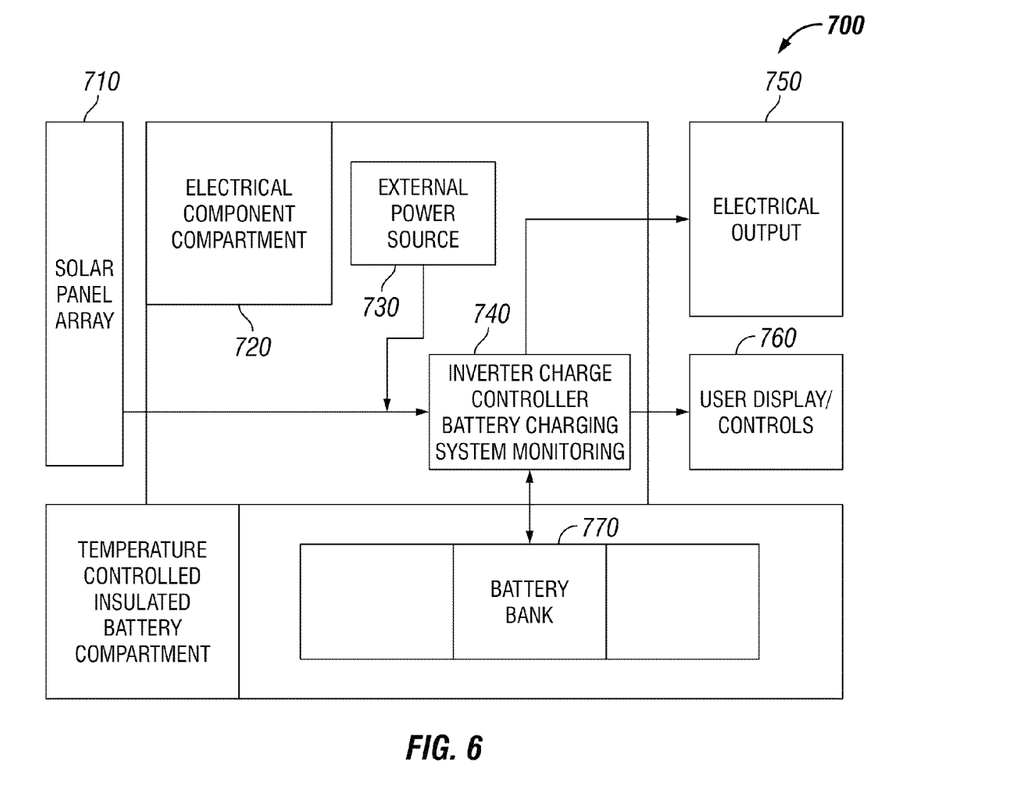
FIG. 6 is an illustrative implementation of a schematic of an electronic system of a portable unfolding solar panel array system.

FIG. 6 is an illustrative implementation of a schematic of an electronic system 700 of a portable unfolding solar panel array system. The electronic system 700 may include, but are not limited to, a solar panel array 710; electrical component compartment 720; external power source 730; controller 740 providing microinverters and/or inverters, charge controller, battery charging, and/or system monitoring; temperature sensors, light sensors, GPS sensors, or other types of sensors; electrical output 750; user display/controls 760; and battery bank 770. Power generated by solar panel array 710 is provided to controller 740 for output to battery bank 770 for storage and/or electrical output 750. Electric component compartment 720 may provide a junction box for various electronic components. Electric component compartment 720 may bring in all the electrical leads to a specific point and determining the voltage output (12 V, 24 V etc). Electric component compartment 720 may also contains charge controller, inverter, electronic communications instrumentation, telco equipment for remote communications, and/or the like. Electrical output 750 allows power from the system to be output to external devices. For example, electrical output may provide connectors that allow the system to be connected to house/building or other external grid, external devices (e.g. AC or DC electronic devices using common 2, 3, 4 prong outlet plugs), external battery bank or external energy storage, or the like. External power source 730 allows and external power source to be connected to the electronic system 700. For example, external power source may be utilized to charge battery bank 770.

The controller 740 may communicate with various components in electronic system 700 to manage various operations provided by the system. Controller 740 provides monitoring of an intelligent power system and optimizing and managing the battery bank 770 charge and discharge cycles. Controller 740 may communicate with temperature sensors detecting the temperature of battery bank 770. Further, charge/discharge cycles may be adjusted in accordance with detected temperatures. Monitoring the performance of the device is crucial to ascertain the optimum placement of the unit relative to the sun's position. Controller 740 may communicate with light intensity detectors or a GPS coordinate system in order to best orientate the panels to ensure maximum performance based on pre-calculated values for the optimum orientation. Controller 740 may provide microinverters and/or inverters for converting energy to AC or DC power.

An operator may utilize user display/controls 760 to view and monitor operations or to control and adjust operations. User display/controls 760 may provide a display, such as an audio/video device, LCD, LED array, visual/audio indicators, or a combination thereof. User display/controls 760 may provide information on the performance of the system, such as whether the unit is charging/discharging the batteries; amount of power that is being harvested by the solar array; whether the unit is operating off of external power; and current being drawn by devices connected to electrical output 750. User display/controls 760 may also monitor and log the unit usage characteristics, and suggest ways to improve efficiency by advised times of day to utilize certain devices, especially power demanding devices such as pumps, heaters, air conditioners or the like. User display/controls 760 may also provide estimated charge or discharge time. Battery bank 770 may utilize rechargeable lead acid batteries, lithium ion-based batteries, or any other suitable rechargeable batteries.

Figure 7:
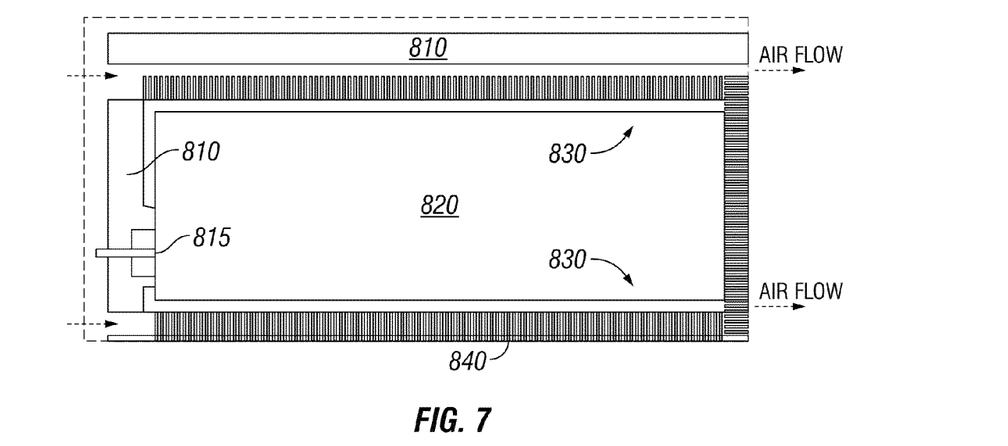
FIG. 7 is an illustrative implementation of a battery bank unit.

FIG. 7 is an illustrative implementation of a battery bank unit. The battery and electronic components are enclosed in containers coated in a thermally insulating material 810 that is customizable in size to accommodate for any power supply/storage requirement. The insulation serves to shield the components from direct heat from the external environment as well as to block any particulates or other undesired material entering and disabling the components. Electrical connections 815 allow battery bank 820 to be connected to an electronic system external to the battery bank unit. In some embodiments, a cooling system may be provided to limit heat build-up in battery bank 820. A passive cooling system is advantageous as it does not require the use of a liquid coolant, which allows use in even the harshest environments without risk of damage. Battery bank 820 may provide capacity to store 1 kW or greater of power. In some embodiments, storage capacity may be as high as 30 kW or greater. Battery bank 820 may be surrounded on one or more sides by heat sinks 830 to absorb heat from the batteries. Heat sinks 830 are in contact with radiators 840 that transfer the heat generated by the batteries to the surround air passing over radiators 840. The battery bank unit provides air flow to the radiators 840 for efficient cooling. New nano-coating comprising of graphitic materials such as nanotubes or bucky-like paper may also be used as a thermal heat sink and energy scavenger.

In another embodiment, the cooling system is not passive and cooling is aided by active fluid flow. For example, in one embodiment, electric fans are utilized to increase air flow over radiators 840. In another embodiment, a thermally conductive fluid (e.g. water, glycerol or any other suitable fluid) flows through radiators 840 to provide more efficient cooling. For example, piping surrounded by the fins of radiators 840 may have fluid pumped through to absorb heat from battery bank 820. In some embodiments, water may be utilized for cooling and the warm water may be provided to a user.

Figure 8:
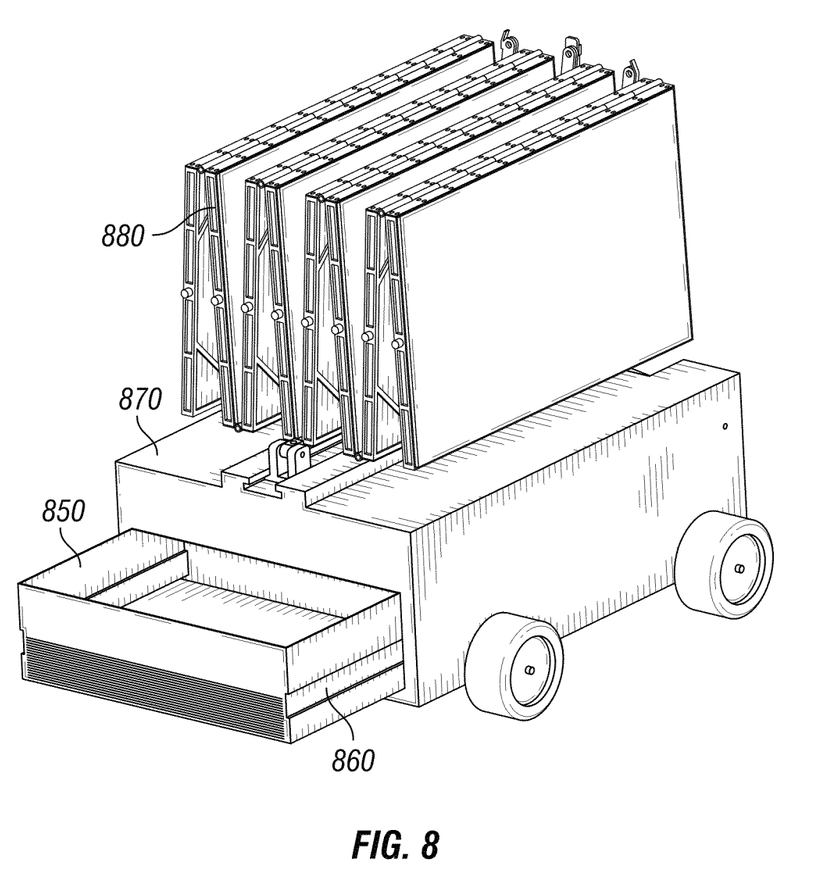
FIG. 8 is an illustrative implementation of a portable unfolding solar panel array system with a battery drawer.

FIG. 8 is an illustrative implementation of a portable unfolding solar panel array system with a battery drawer 850. For ease of use, the battery bank unit is easily removed and replaced by accessing the unit from battery drawer 850. Battery drawer 850 may have guides 860 or the like on each side to allow the drawer to easily slide in and out of main support frame 870 for quick access. Solar panel array 880 is shown in a folded or undeployed position.

Figures 9A, 9B:
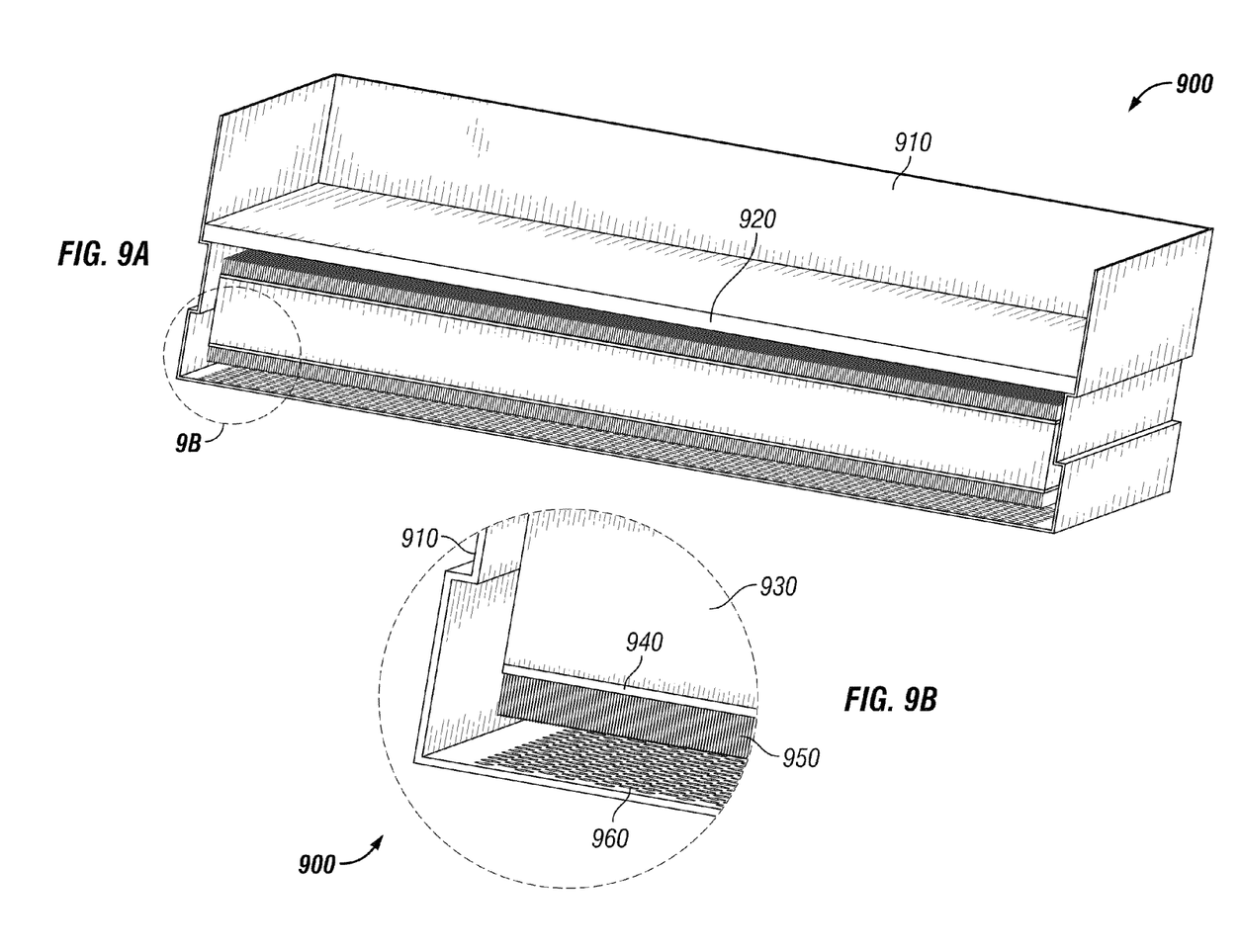
FIGS. 9A-9B are illustrative implementations of a battery bank unit and close up view of the unit.

FIGS. 9A-9B are illustrative implementations of a battery bank unit 900 and close up view of the unit. Battery drawer 910 houses the battery bank unit. Insulator 920 minimizes the amount of heat exposure from external sources, and protects the unit from debris. Battery bank 930 is in contact with heat sinks 940 and radiator 950, which aid in dissipating heat from the unit. Battery drawer 910 may provide circulation vents 960 to improve airflow, which provides improved heat dissipation.

Another preferred embodiment of the present invention discloses a method for generating sufficient power to support telecommunication needs. This is particularly important in situations where no other source of power can support such needs.

The challenges encountered in telecommunications relate to (1) the ability to send signals over large distances, be it mobile phone masts or other types of telecommunications, and (2) the access to sufficient power to successfully achieve the transmission, particularly in situations when signals need to be amplified and/or regenerated in case of loss of signal strength. The locations that receive, regenerate and resend these signals are called repeater stations. The challenges associated with repeater stations are that a physical barrier may be present that needs to be broadcasted over. The physical barrier may be difficult to traverse, remotely located in uninhabited areas, difficult to provide access to a reliable power source, or the like. Further, the cost for building communications mast or the like may be significant. Instead, a more attractive solution is to have each communications mats be energetically self-sufficient and with low maintenance requirements.

In some embodiments, a portable unfolding solar panel array system may be utilized in conjunction with a communications mast to provide an energetically self-sufficient and low maintenance communications unit. In particular, the unit is beneficial for remote areas that are difficult to reach. Weather sensors, such as anemometers or other sensor, can be placed on the masts to detect harsh weather conditions and may trigger automatic folding of the solar panel array.

Embodiments described herein are included to demonstrate particular aspects of the present disclosure. It should be appreciated by those of skill in the art that the embodiments described herein merely represent exemplary implementation of the disclosure. Those of ordinary skill in the art should, in light of the present disclosure, appreciate that many changes can be made in the specific embodiments described and still obtain a like or similar result without departing from the spirit and scope of the present disclosure. From the foregoing description, one of ordinary skill in the art can easily ascertain the essential characteristics of this disclosure, and without departing from the spirit and scope thereof, can make various changes and modifications to adapt the disclosure to various usages and conditions. The embodiments described hereinabove are meant to be illustrative only and should not be taken as limiting of the scope of the disclosure.

What is claimed is:

1. A solar panel deployment system comprising:
a main support frame;
a solar panel array providing at least one solar panel, wherein the solar panel array is coupled to the main support frame, and each of the solar panels are mounted in a solar panel frame;
a lift mechanism coupled to the main support frame and solar panel array, wherein the lift mechanism tilts the solar panel array to a desired angle when actuated, and
wherein further the lift mechanism comprises
a main mast coupled to the solar panel array;
a rear mast support coupled to the main mast; and
a lower guide coupled to the main mast, wherein the lower guide is actuated in a first direction to lift the solar panel array or actuated in an opposite direction to lower the solar panel array; and
an array extender/retractor coupled to the solar panel array, wherein the array extender/retractor is actuated to deploy the solar panel array or to retract the solar panel array, and
wherein further the array extender/retractor comprises
an array actuator coupled to the solar panel array, wherein the array actuator is actuated in a first direction to deploy the solar panel array, and the array actuator is actuated in a second direction the to retract the solar panel array; and
a first set of extender arm coupled to the array actuator and at least one of the solar panel frames.

2. The system of claim 1, wherein the array actuator comprises a first threaded ferrule coupled to a first threaded rod, wherein the first threaded rod is rotated in a first direction to deploy at least a first set of solar panels, and the first threaded rod is rotated in a second direction to retract said first set of solar panels.

3. The system of claim 1, wherein the first set of extender arms forms scissor arms with the solar panel frames.

4. The system of claim 1, further comprising a second set of extender arms forming scissor arms with the first set of extender arms.

5. The system of claim 1, wherein the array actuator comprises
a first threaded rod coupled to a first set of solar panels, wherein the first threaded rod is rotated in a first direction to deploy at least a first set of solar panels, and the first threaded rod is rotated in a second direction to retract said first set of solar panels; and
a second threaded rod coupled to a second set of solar panels, wherein the second threaded rod is rotated in a first direction to deploy the second set of solar panels, and the second threaded rod is rotated in a second direction to retract said second set of solar panels.

6. The system of claim 5, wherein the first set of extender arms forms scissor arms with the solar panel frames.

7. The system of claim 5, further comprising a second set of extender arms forming scissor arms with the first set of extender arms.

8. The system of claim 1, wherein the main support frame provides two or more wheels.

9. The system of claim 1, wherein the solar panel deployment system generates 1 kW or greater of power.

10. The system of claim 1, further comprising a battery bank electronically coupled to the solar panel array, wherein power generated by the solar panel array is utilized to charge the battery bank.

11. The system of claim 10, further comprising a sensor, wherein data provided by said sensor is utilized to determine the desired angle of the solar panel array.

12. The system of claim 10, further comprising a sensor, wherein data provided by the sensor is utilized to determine if the solar panel array should be retracted.

13. The system of claim 10, further comprising a user display for displaying data from and for controlling the solar panel deployment system.

14. The system of claim 10, wherein the battery bank coupled to a heat sink or a radiator.

15. The system of claim 10, wherein the battery bank is insulated.

16. A solar panel deployment system comprising:
a main support frame;
a solar panel array providing at least one solar panel, wherein the solar panel array is coupled to the main support frame;
a lift mechanism coupled to the main support frame and solar panel array, wherein the lift mechanism raises or lowers the solar panel array, and
wherein further the lift mechanism comprises
    a main mast coupled to the solar panel array,
    a rear mast support coupled to the main mast, and
    a lower guide coupled to the main mast, wherein the lower guide is actuated in a forward direction to lift the solar panel array or actuated in a reverse direction to lower the solar panel array; and
an array extender/retractor for deploying and retracting the solar panel array, the array extender/retractor comprising,
    one or more sets of scissor arms coupled to the solar panel array;
    at least one ferrule coupled to said scissor arms, wherein movement of said ferrule extends or retracts said scissor arms; and
    at least one array rod coupled to said ferrule, wherein said array rod guides the movement of said ferrule.

17. The system of claim 16, wherein said scissor arms are formed by extender arms.

18. The system of claim 16, wherein said scissor arms are formed by extender arms and solar panel frames.

19. The system of claim 16, wherein a first set of solar panels from said panel array are operated by a first set of scissor arms, and a second set of solar panels from said panel array are operated by a second set of scissor arms.

20. The system of claim 16, wherein the lift mechanism comprises
    scissor lift arms with a first end coupled to the solar panel array; and
    a threaded lift rod coupled to a threaded ferrule, wherein a second end of the scissor lift arms is coupled to the threaded ferrule, and the threaded lift rod is rotate in one direction to lift the solar panel array or rotated in an opposite direction to lower the solar panel array.

21. The system of claim 16, further comprising a battery bank electronically coupled to the solar panel array, wherein power generated by the solar panel array is utilized to charge the battery bank.

22. The system of claim 21, further comprising a sensor, wherein data provided by said sensor is utilized to determine the desired angle of the solar panel array.

23. The system of claim 21, further comprising a sensor, wherein data provided by the sensor is utilized to determine if the solar panel array should be retracted.

24. The system of claim 16, further comprising a user display for displaying data from and for controlling the solar panel deployment system.

* * * * *